(12) United States Patent
Chadha et al.

(10) Patent No.: US 10,255,107 B2
(45) Date of Patent: *Apr. 9, 2019

(54) OPERATION OF A MULTI-SLICE PROCESSOR IMPLEMENTING A LOAD/STORE UNIT MAINTAINING REJECTED INSTRUCTIONS

(71) Applicant: International Business Machines Corporation, Armonk, NY (US)

(72) Inventors: Sundeep Chadha, Austin, TX (US); Robert A. Cordes, Austin, TX (US); David A. Hrusecky, Cedar Park, TX (US); Hung Q. Le, Austin, TX (US); Elizabeth A. McGlone, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,850

(22) Filed: Jun. 1, 2018

(65) Prior Publication Data

US 2018/0276132 A1  Sep. 27, 2018

Related U.S. Application Data

(63) Continuation of application No. 15/221,035, filed on Jul. 27, 2016, now Pat. No. 10,042,770, which is a
(Continued)

(51) Int. Cl.
*G06F 9/46* (2006.01)
*G06F 9/50* (2006.01)
(Continued)

(52) U.S. Cl.
CPC ........ *G06F 9/5027* (2013.01); *G06F 9/30043* (2013.01); *G06F 9/3891* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 4,858,113 A | 8/1989 | Saccardi |
| 5,055,999 A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

Anonymous, *A Novel Data Prefetch Method Under Heterogeneous Architecture*, IP.com Prior Art Database Technical Disclosure No. 000224167 (online), Dec. 2012, 14 pages, URL: http://ip.com/IPCOM/000224167.

(Continued)

*Primary Examiner* — Gregory A Kessler
(74) *Attorney, Agent, or Firm* — Nathan M. Rau

(57) ABSTRACT

Operation of a multi-slice processor that includes a plurality of execution slices, a plurality of load/store slices, and one or more instruction sequencing units, where operation includes: receiving, at a load/store slice from an instruction sequencing unit, a instruction to be issued; determining, at the load/store slice, a rejection condition for the instruction; and responsive to determining the rejection condition for the instruction, maintaining state information for the instruction in the load/store slice instead of notifying the instruction sequencing unit of a rejection of the instruction.

7 Claims, 6 Drawing Sheets

Related U.S. Application Data continuation of application No. 15/152,257, filed on May 11, 2016, now Pat. No. 10,037,229.

(51) Int. Cl.
  *G06F 9/30* (2018.01)
  *G06F 12/0875* (2016.01)
  *G06F 9/38* (2018.01)

(56) References Cited

U.S. PATENT DOCUMENTS

| | | |
|---|---|---|
| 5,095,424 A | 3/1992 | Woffinden et al. |
| 5,353,426 A | 10/1994 | Patel et al. |
| 5,418,922 A | 5/1995 | Liu |
| 5,471,593 A | 11/1995 | Branigin |
| 5,475,856 A | 12/1995 | Kogge |
| 5,553,305 A | 9/1996 | Gregor et al. |
| 5,630,149 A | 5/1997 | Bluhm |
| 5,664,215 A | 9/1997 | Burgess et al. |
| 5,680,597 A | 10/1997 | Kumar et al. |
| 5,724,536 A | 3/1998 | Abramson et al. |
| 5,809,522 A | 9/1998 | Novak et al. |
| 5,809,530 A | 9/1998 | Samra et al. |
| 5,822,602 A | 10/1998 | Thusoo |
| 5,897,651 A | 4/1999 | Cheong et al. |
| 5,909,588 A | 6/1999 | Fujimura et al. |
| 5,913,048 A | 6/1999 | Cheong et al. |
| 5,996,068 A | 11/1999 | Dwyer, III et al. |
| 6,021,485 A | 2/2000 | Feiste et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,098,166 A | 8/2000 | Leibholz et al. |
| 6,108,753 A | 8/2000 | Bossen et al. |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,269,427 B1 | 1/2001 | Kuttanna et al. |
| 6,212,544 B1 | 4/2001 | Borkenhagen et al. |
| 6,237,081 B1 | 5/2001 | Le et al. |
| 6,286,027 B1 | 9/2001 | Dwyer, III et al. |
| 6,311,261 B1 | 10/2001 | Chamdani et al. |
| 6,336,168 B1 | 1/2002 | Frederick, Jr. et al. |
| 6,336,183 B1 | 1/2002 | Le et al. |
| 6,356,918 B1 | 3/2002 | Chuang et al. |
| 6,381,676 B2 | 4/2002 | Aglietti et al. |
| 6,418,513 B1 | 7/2002 | Arimilli et al. |
| 6,418,525 B1 | 7/2002 | Charney et al. |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,553,480 B1 | 4/2003 | Cheong et al. |
| 6,564,315 B1 | 5/2003 | Keller et al. |
| 6,654,876 B1 | 11/2003 | Le et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,847,578 B2 | 1/2005 | Ayukawa et al. |
| 6,868,491 B1 | 3/2005 | Moore |
| 6,883,107 B2 | 4/2005 | Rodgers et al. |
| 6,901,504 B2 | 5/2005 | Luick |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,100,157 B2 | 8/2006 | Collard |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,350,056 B2 | 3/2008 | Abernathy et al. |
| 7,386,704 B2 | 6/2008 | Schulz et al. |
| 7,395,419 B1 | 7/2008 | Gonion |
| 7,398,374 B2 | 7/2008 | Delano |
| 7,401,188 B2 | 7/2008 | Matthews |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,509,484 B1 | 3/2009 | Golla et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,669,035 B2 | 2/2010 | Young et al. |
| 7,669,036 B2 | 2/2010 | Brown et al. |
| 7,685,410 B2 | 3/2010 | Shen et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,889,204 B2 | 2/2011 | Hansen et al. |
| 7,890,735 B2 | 2/2011 | Tran |
| 7,926,023 B2 | 4/2011 | Okawa et al. |
| 7,949,859 B2 | 5/2011 | Kalla et al. |
| 7,975,134 B2 | 7/2011 | Gonion |
| 7,987,344 B2 | 7/2011 | Hansen et al. |
| 8,028,152 B2 | 9/2011 | Glew |
| 8,041,928 B2 | 10/2011 | Burky et al. |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,131,942 B2 | 3/2012 | Harris et al. |
| 8,131,980 B2 | 3/2012 | Hall et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,151,012 B2 | 4/2012 | Kim et al. |
| 8,166,282 B2 | 4/2012 | Madriles et al. |
| 8,184,686 B2 | 5/2012 | Wall et al. |
| 8,219,783 B2 | 7/2012 | Hara |
| 8,219,787 B2 | 7/2012 | Lien et al. |
| 8,243,866 B2 | 8/2012 | Huang et al. |
| 8,250,341 B2 | 8/2012 | Schulz et al. |
| 8,271,765 B2 | 9/2012 | Bose et al. |
| 8,325,793 B2 | 12/2012 | Zhong |
| 8,335,892 B1 | 12/2012 | Minkin et al. |
| 8,386,751 B2 | 2/2013 | Ramchandran et al. |
| 8,402,256 B2 | 3/2013 | Arakawa |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,521,992 B2 | 8/2013 | Alexander et al. |
| 8,555,039 B2 | 10/2013 | Rychlik |
| 8,578,140 B2 | 11/2013 | Yokoi |
| 8,654,884 B2 | 2/2014 | Kerr |
| 8,656,401 B2 | 2/2014 | Venkataramanan et al. |
| 8,683,182 B2 | 3/2014 | Hansen et al. |
| 8,713,263 B2 | 4/2014 | Bryant |
| 8,793,435 B1 | 7/2014 | Ashcraft et al. |
| 8,806,135 B1 | 8/2014 | Ashcraft et al. |
| 8,850,121 B1 | 9/2014 | Ashcraft et al. |
| 8,929,496 B2 | 1/2015 | Lee et al. |
| 8,935,513 B2 | 1/2015 | Guthrie et al. |
| 8,966,232 B2 | 2/2015 | Tran |
| 8,984,264 B2 | 3/2015 | Karlsson et al. |
| 9,069,563 B2 | 6/2015 | Konigsburg et al. |
| 9,207,995 B2 | 12/2015 | Boersma et al. |
| 9,223,709 B1 | 12/2015 | O'Bleness et al. |

(56) References Cited

U.S. PATENT DOCUMENTS

| | | |
|---|---|---|
| 9,519,484 B1 | 12/2016 | Stark |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 9,934,033 B2 | 4/2018 | Cordes et al. |
| 9,940,133 B2 | 4/2018 | Cordes et al. |
| 9,983,875 B2 | 5/2018 | Chadha et al. |
| 10,037,211 B2 | 7/2018 | Fernsler et al. |
| 10,037,229 B2 | 7/2018 | Farnsler et al. |
| 10,042,647 B2 | 8/2018 | Eickemeyer et al. |
| 10,042,770 B2 | 8/2018 | Chadha et al. |
| 2002/0078302 A1 | 6/2002 | Favor |
| 2002/0138700 A1 | 9/2002 | Holmberg |
| 2002/0194251 A1 | 12/2002 | Richter et al. |
| 2003/0120882 A1 | 6/2003 | Granston et al. |
| 2003/0163669 A1 | 8/2003 | Delano |
| 2003/0182537 A1 | 9/2003 | Le et al. |
| 2004/0111594 A1 | 6/2004 | Feiste et al. |
| 2004/0162966 A1 | 8/2004 | Webb, Jr. et al. |
| 2004/0172521 A1 | 9/2004 | Hooker et al. |
| 2004/0181652 A1 | 9/2004 | Ahmed et al. |
| 2004/0216101 A1 | 10/2004 | Burky et al. |
| 2005/0060518 A1 | 3/2005 | Augsburg et al. |
| 2005/0138290 A1 | 6/2005 | Hammarlund et al. |
| 2006/0095710 A1 | 5/2006 | Pires Dos Reis Moreira et al. |
| 2006/0106923 A1 | 5/2006 | Balasubramonian et al. |
| 2006/0143513 A1 | 6/2006 | Hillman et al. |
| 2007/0022277 A1 | 1/2007 | Iwamura et al. |
| 2007/0079303 A1 | 4/2007 | Du et al. |
| 2007/0101102 A1 | 5/2007 | Dierks, Jr. et al. |
| 2007/0106874 A1 | 5/2007 | Pan et al. |
| 2007/0180221 A1 | 8/2007 | Abernathy et al. |
| 2007/0204137 A1 | 8/2007 | Tran |
| 2008/0098260 A1 | 4/2008 | Okawa et al. |
| 2008/0104375 A1 | 5/2008 | Hansen et al. |
| 2008/0133885 A1 | 6/2008 | Glew |
| 2008/0162889 A1 | 7/2008 | Cascaval et al. |
| 2008/0162895 A1 | 7/2008 | Luick |
| 2008/0172548 A1 | 7/2008 | Caprioli et al. |
| 2008/0270749 A1 | 10/2008 | Ozer et al. |
| 2008/0307182 A1 | 12/2008 | Arimilli et al. |
| 2008/0313424 A1 | 12/2008 | Gschwind |
| 2009/0037698 A1 | 2/2009 | Nguyen |
| 2009/0113182 A1 | 4/2009 | Abernathy et al. |
| 2009/0198921 A1 | 8/2009 | Chen et al. |
| 2009/0265532 A1 | 10/2009 | Caprioli et al. |
| 2009/0282225 A1 | 11/2009 | Caprioli et al. |
| 2009/0300319 A1 | 12/2009 | Cohen et al. |
| 2010/0100685 A1 | 4/2010 | Kurosawa et al. |
| 2010/0161945 A1 | 6/2010 | Burky et al. |
| 2010/0191940 A1 | 7/2010 | Mejdrich et al. |
| 2010/0262781 A1 | 10/2010 | Hrusecky et al. |
| 2011/0078697 A1 | 3/2011 | Smittle et al. |
| 2012/0060015 A1 | 3/2012 | Eichenberger et al. |
| 2012/0060016 A1 | 3/2012 | Eichenberger et al. |
| 2012/0066482 A1 | 3/2012 | Gonion |
| 2012/0110271 A1 | 5/2012 | Boersma et al. |
| 2012/0226865 A1 | 9/2012 | Choi et al. |
| 2012/0246450 A1 | 9/2012 | Abdallah |
| 2013/0254488 A1 | 9/2013 | Kaxiras et al. |
| 2013/0305022 A1 | 11/2013 | Eisen et al. |
| 2013/0339670 A1 | 12/2013 | Busaba |
| 2014/0025933 A1 | 1/2014 | Venkataramanan et al. |
| 2014/0040599 A1 | 2/2014 | Fleischer et al. |
| 2014/0075159 A1 | 3/2014 | Frigo et al. |
| 2014/0189243 A1 | 7/2014 | Cuesta et al. |
| 2014/0215189 A1 | 7/2014 | Airaud et al. |
| 2014/0223144 A1 | 8/2014 | Heil et al. |
| 2014/0244239 A1 | 8/2014 | Nicholson et al. |
| 2014/0281408 A1 | 9/2014 | Zeng |
| 2014/0325188 A1 | 10/2014 | Ogasawara |
| 2015/0046662 A1 | 2/2015 | Heinrich et al. |
| 2015/0121010 A1 | 4/2015 | Kaplan et al. |
| 2015/0121046 A1 | 4/2015 | Kunjan et al. |
| 2015/0134935 A1 | 5/2015 | Blasco |
| 2015/0199272 A1 | 7/2015 | Goel et al. |
| 2015/0324204 A1 | 11/2015 | Eisen et al. |
| 2015/0324205 A1 | 11/2015 | Eisen et al. |
| 2015/0324206 A1 | 11/2015 | Eisen et al. |
| 2015/0324207 A1 | 11/2015 | Eisen et al. |
| 2016/0070571 A1 | 3/2016 | Boersma et al. |
| 2016/0070574 A1 | 3/2016 | Boersma et al. |
| 2016/0092231 A1 | 3/2016 | Chu et al. |
| 2016/0092276 A1 | 3/2016 | Chu et al. |
| 2016/0103715 A1 | 4/2016 | Sethia et al. |
| 2016/0202986 A1 | 7/2016 | Ayub et al. |
| 2016/0202988 A1 | 7/2016 | Ayub et al. |
| 2016/0202989 A1 | 7/2016 | Eisen et al. |
| 2016/0202990 A1 | 7/2016 | Brownscheidle et al. |
| 2016/0202991 A1 | 7/2016 | Eisen et al. |
| 2016/0202992 A1 | 7/2016 | Brownscheidle et al. |
| 2017/0168837 A1 | 6/2017 | Eisen et al. |
| 2017/0255465 A1 | 9/2017 | Chadha et al. |
| 2017/0277542 A1 | 9/2017 | Fernsler et al. |
| 2017/0277543 A1 | 9/2017 | McGlone et al. |
| 2017/0300328 A1 | 10/2017 | Cordes et al. |
| 2017/0329641 A1 | 11/2017 | Chadha et al. |
| 2017/0329713 A1 | 11/2017 | Chadha et al. |
| 2017/0351521 A1 | 12/2017 | Hrusecky |
| 2017/0357507 A1 | 12/2017 | Cordes et al. |
| 2017/0357508 A1 | 12/2017 | Cordes et al. |
| 2017/0371658 A1 | 12/2017 | Eickemeyer et al. |
| 2018/0039577 A1 | 2/2018 | Chadha et al. |
| 2018/0067746 A1 | 3/2018 | Chu et al. |

FOREIGN PATENT DOCUMENTS

| | | |
|---|---|---|
| CN | 101876892 A | 11/2010 |
| CN | 102004719 A | 4/2011 |
| EP | 1212680 B1 | 7/2007 |
| GB | 2356324 A | 5/2001 |
| GB | 2356324 B | 10/2001 |
| JP | 2009157887 A | 7/2009 |
| WO | WO-2015/067118 A1 | 5/2015 |

OTHER PUBLICATIONS

Anonymous, *Method and System for Predicting Performance Trade-Offs During Critical Path Execution in a Processor*, IP.com Prior Art Database Technical Disclosure No. 000223340 (online), Nov. 2012, 7 pages, URL: http://ip.com/IPCOM/000223340.

IBM, *Using a mask to block the wakeup of dependents of already-issued instructions*, An IP.com Prior Art Database Technical Disclosure (online), IP.com No. 000193322, URL: http://ip.com/IPCOM/000193322, dated Feb. 18, 2010, 2 pages.

Anonymous, *Fast wakeup of load dependent instructions by a select bypass*, an IP.com Prior Art Database Technical Disclosure (online), IP.com No. 000216900, URL: http://ip.com/IPCOM/000216900, dated Apr. 23, 2012, 2 pages.

Anonymous, *Un-Aligned Store Handling in a Multi-Slice Microprocessor*, An IP.com Prior Art Database Technical Disclosure (online), Oct. 2015, 2 pages, IP.com No. IPCOM000243946D, URL: https://ip.com/IPCOM/000243946.

Ware et al., *Improving Power and Data Efficiency with Threaded Memory Modules*, International Conference on Computer Design, Oct. 2006, pp. 417-24, IEEE Xplore Digital Library (online), DOI: 10.1109/ICCD.2006.4380850, San Jose, CA.

Kalla, et al., *IBM Power5 Chip: A Dual-Core Multithreaded Processor*, IEEE Micro, vol. 24, No. 2, Mar. 2004, pp. 40-47, IEEE Xplore Digital Library (online), DOI: 10.1109/MM.2004.1289290.

Mathis et al., *Characterization of simultaneous multithreading (SMT) efficiency in POWER5*, IBM Journal of Research and Development, Jul. 2005, pp. 555-564, vol. 49, No. 4/5, International Business Machines Corporation, Armonk, NY.

Sha et al., *Scalable Store-Load Forwarding via Store Queue Index Prediction*, Proceedings of the 38th Annual IEEE/ACM Interna-

(56) References Cited

OTHER PUBLICATIONS tional Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.

Anonymous, *Method and system for Implementing "Register Threads" in a Simultaneously-Multithreaded (SMT) Processor Core*, An IP.com Prior Art Database Technical Disclosure, IP.com No. IPCOM000199825D IP.com Electronic Publication: Sep. 17, 2010 pp. 1-4 <http://ip.com/IPCOM/000199825>.

Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.

Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.

Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-65, vol. 1685, Spring Berlin Heidelberg, Toulouse, France.

Pechanek et al., *The ManArray Embedded Processor Architecture*, Proceedings of the 26 Euromicro Conference, IEEE Computer Society, Sep. 5-7, 2000, pp. 348-55, vol. 1, Maastricht.

Anonymous, *Precise Merging Translation Queue in a Slice-Based Processor*, An IP.com Prior Art Database Technical Disclosure, IP.com No: IPCOM000249317D IP.com Electronic Publication: Feb. 16, 2017, pp. 1-3. <https://prioratip.com/IPCOM/000249317>.

Roth, *Store Vulnerability Window (SVW): Re-Execution Filtering for Enhanced Load/Store Optimization*, Technical Reports (CIS), Paper 35, Jan. 2004, 23 pages, University of Pennsylvania Scholarly Commons (online), <https://repository.upenn.edu/cgi/viewcontent.cgi?referer=https://www.google.com/&httpsredir=1&article=1023&context=cis_reports>.

Bobba et al., *Safe and Efficient Supervised Memory Systems*, 17th International Symposium on High Performance Computer Architecture (HPCA), Feb. 2011, 12 pages, IEEE xPlore Digital Library (online; IEEE.org), DOI: 10.1109/HPCA.2011.5749744.

U.S. Appl. No. 15/997,863, to Sundeep Chadha et al., entitled, *Operation of a Multi-Slice Processor Implementing A Load/Store Unit Maintaining Rejected Instructions*, assigned to International Business Machines Corporation, 37 pages, filed Jun. 5, 2018.

U.S. Appl. No. 16/003,950, to Kimberly M. Fernsler et al., entitled, *Operation of a Multi-Slice Processor With an Expanded Merge Fetching Queue*, assigned to International Business Machines Corporation, 35 pages, filed Jun. 8, 2018.

U.S. Appl. No. 15/980,237, to Richard J. Eickemeyer et al., entitled, *Managing a Divided Load Reorder Queue*, assigned to International Business Machines Corporation, 36 pages, filed May 15, 2018.

Appendix P; List of IBM Patent or Applications Treated as Related, Aug. 28, 2018, 2 pages.

International Search Report and Written Opinion, PCT/IB2015/052741, dated Oct. 9, 2015, 10 pages.

US 10,255,107 B2

OPERATION OF A MULTI-SLICE PROCESSOR IMPLEMENTING A LOAD/STORE UNIT MAINTAINING REJECTED INSTRUCTIONS

CROSS-REFERENCE TO RELATED APPLICATIONS

This application is a continuation application of and claims priority from U.S. patent application Ser. No. 15/221,035, filed Jul. 27, 2016, which is a continuation application of and claims priority from U.S. patent application Ser. No. 15/152,257, filed May 11, 2016.

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include one or more instruction sequencing units. Operation of such a multi-slice processor includes: receiving, at a load/store slice from an instruction sequencing unit, a instruction to be issued; determining, at the load/store slice, a rejection condition for the instruction; and responsive to determining the rejection condition for the instruction, maintaining state information for the instruction in the load/store slice instead of notifying the instruction sequencing unit of a rejection of the instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
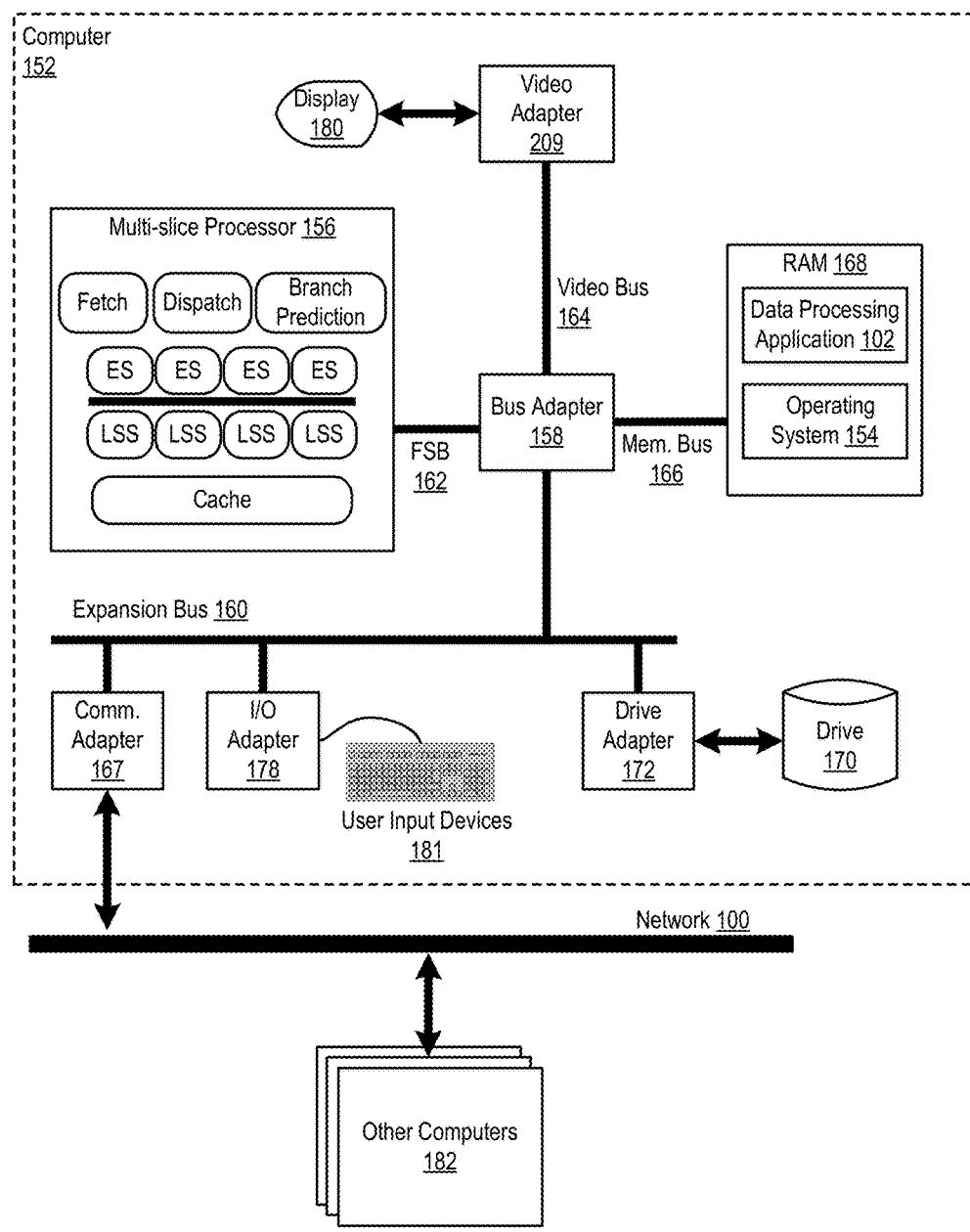
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
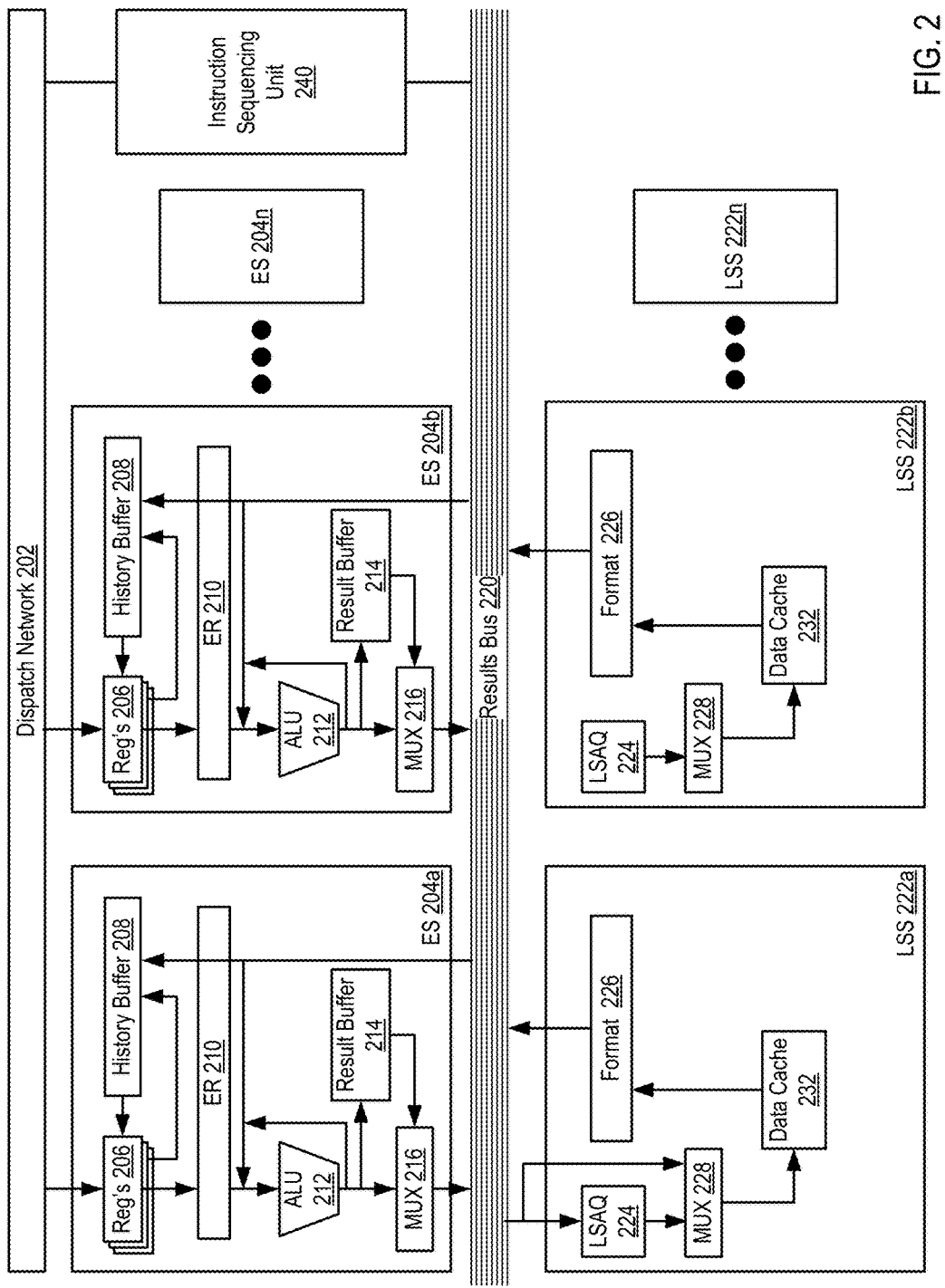
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
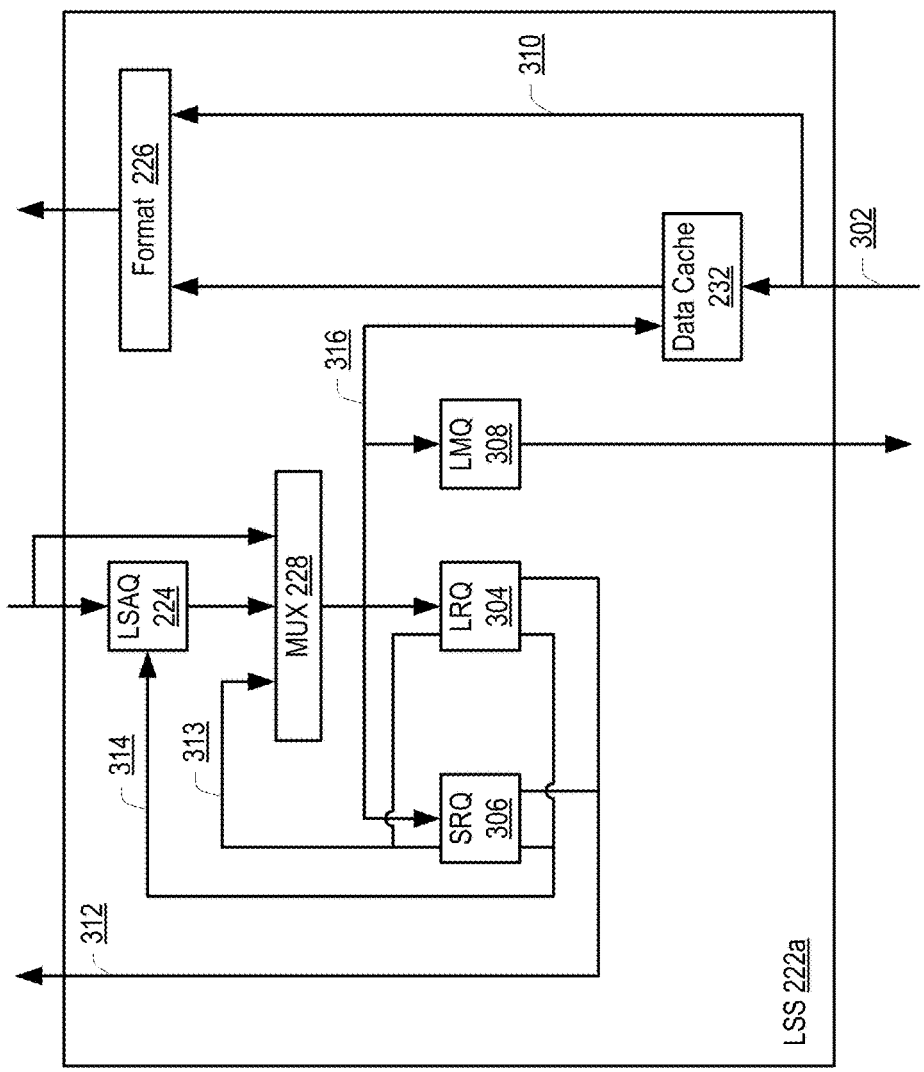
FIG. 3 sets forth a block diagram of a portion of a load/store slice of a multi-slice processor, where the load/store slice implements maintaining rejected instructions according to different embodiments.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), a data cache (232), among other components.

In previous systems, if a load/store unit received an instruction from an instruction sequencing unit, and the load/store unit was unable to handle the instruction for some reason, then the load/store unit would notify the instruction sequencing unit that the instruction was being rejected and the load/store unit would discard information related to the rejected instruction. In which case, the instruction sequencing unit would continue maintaining information to track and maintain the rejected instruction until the instruction is resent to the load/store unit. An instruction may be rejected for a variety of reasons, including an address miss in an address translation cache, a set prediction miss, data cache banking collisions, an overload of the load miss queue (308), among other possible rejection conditions.

The load/store slice (222a), by contrast to the above previous system, is configured to determine a rejection condition for an instruction received from an instruction sequencing unit, however, the load/store slice (222a), instead of sending a reject signal to the instruction sequencing unit, maintains tracking and handling of the instruction—including information usable to relaunch or reissue the instruction—until the rejection condition is resolved. Further, an entry in the load reorder queue (304) or the store reorder queue (306) may be configured to maintain information for tracking an instruction that would otherwise have been rejected and removed from the load reorder queue (304). For example, if the load/store slice (222a) determines that a rejection condition exists for a given load or store instruction, then logic within the load/store slice may notify the load reorder queue (304) or the store reorder queue (306) to place the instruction in a sleep state for a given number of cycles, or to place the instruction in a sleep state until notified to awaken, or to immediately reissue the instruction, among other notifications to perform other operations.

In this way, the load/store slice (222a) may save cycles that would otherwise be lost if the instruction were rejected to the instruction sequencing unit because the load/store slice (222a) may more efficiently and quickly reissue the instruction when the rejection condition is resolved in addition to more quickly detecting resolution of a rejection condition than an instruction sequencing unit. For example, if the load/store slice (222a) determines that an instruction that is in a sleep state may be reissued in response to determining that one or more rejection conditions have been resolved preventing the instruction from completing, then the load/store store slice may notify the load reorder queue (304) or the store reorder queue (306) to relaunch or reissue the instruction immediately or after some number of cycles. The number of cycles may depend upon a type of rejection condition or upon other factors affecting reissue or relaunch of the instruction. In this example, the load reorder queue (304) or the store reorder queue (306) may reissue or relaunch an instruction by providing the load/store access queue (224) with information to reissue the instruction, where the load reorder queue (304) or the store reorder queue (306) may communicate with the load/store access queue (224) along line (314) and may provide data for reissuing or relaunching the instruction along line (313).

Another improvement that results from the load/store slice (222a) maintaining an instruction if a rejection condition is determined is that the load/store slice (222a) uses fewer resources, such as logic and circuitry for latches and other components, to maintain the instruction than an instruction sequencing unit. In other words, given that the instruction sequencing unit may rely on the load/store slice (222a) in handling the instruction to completion, the instruction sequencing unit may free resources once the instruction is provided to the load/store slice (222a).

Further, the instruction sequencing unit (240), based at least in part on communications with the load/store slice (222a), may determine when and whether to wake instructions that may be dependent on a current instruction being handled by the load/store slice (222a). Therefore, if the load/store slice (222a) determines that a rejection condition exists, the load/store slice (222a) delays a notification to the instruction sequencing unit (240) to awaken dependent instructions to prevent the instruction sequencing unit (240) from issuing dependent instructions that are subsequently unable to finish due to lack of availability of results from a current instruction. In this way, the instruction sequencing unit (240) may avoid wasting execution cycles reissuing dependent instructions that are unable to finish.

For example, the load/store slice (222a) may communicate with the instruction sequencing unit (240) through the generation of signals indicating, at different points in handling a load instruction, that a load instruction is to be reissued or that data for a load instruction is valid. In some cases, in response to the instruction sequencing unit (240) receiving a signal from the load/store slice (222a) that a given instruction is to be reissued, the instruction sequencing unit (240) may awaken instructions dependent upon the given instruction with the expectation that the given instruction, after being reissued, is going to finish and provide valid data.

The load/store slice (222a) may also retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Figure 4:
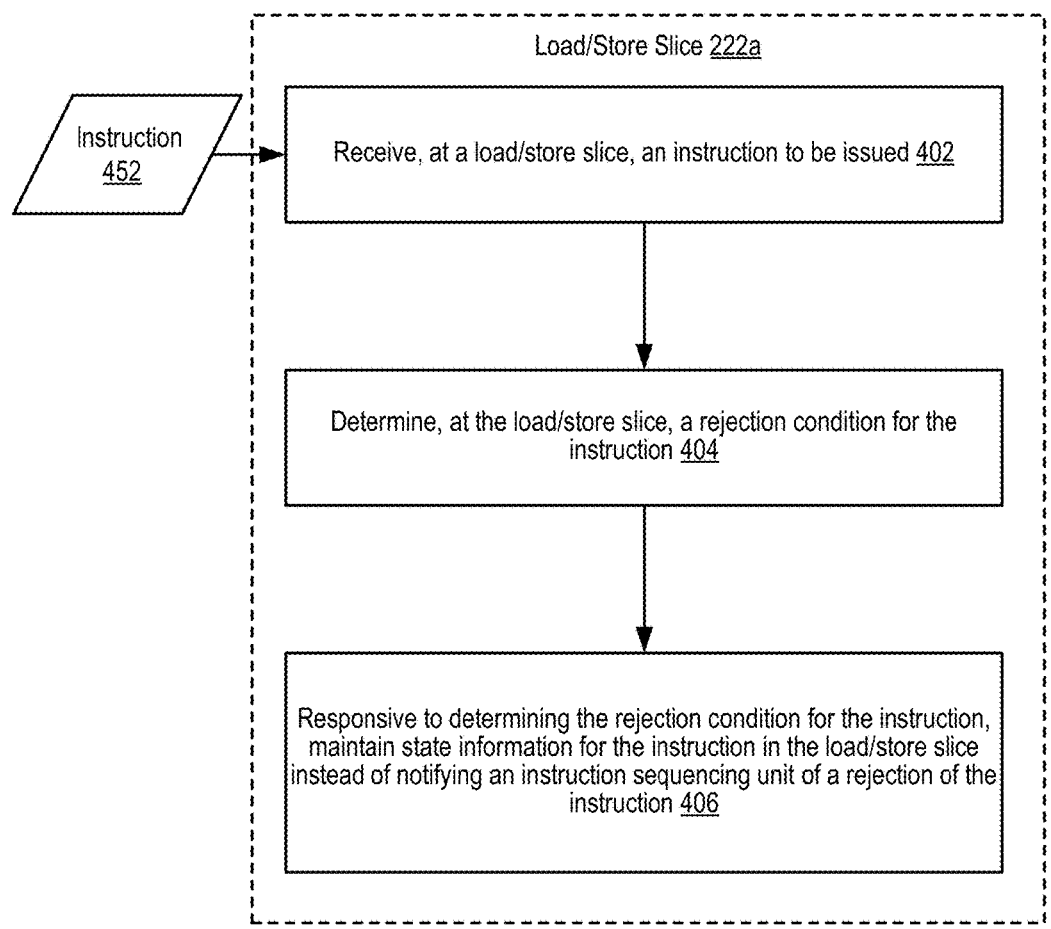
FIG. 4 sets forth a flow chart illustrating an exemplary method of operation of a multi-slice processor, where the load/store slice implements maintaining rejected instructions according to different embodiments.

For further explanation, FIG. 4 sets forth a flow chart illustrating an exemplary method of operation of a multi-slice processor implementing a load/store unit configured to maintain rejected instructions. The method of FIG. 4 may be carried out by a multi-slice processor similar to that in the examples of FIGS. 1-3. Such a multi-slice processor may include an instruction sequencing unit (240), and a plurality of load/store slices (220a-220n), where each of the load/store slices may implement a load/store access queue (224), a load reorder queue (304), and a store reorder queue (306), as described above with regard to FIG. 3.

The method of FIG. 4 also includes receiving (402), at a load/store slice (222*a*), an instruction (452) to be issued. Receiving (402) the instruction may be carried out by the load/store slice (222*a*) receiving a request for the data at the load/store access queue (224), and moving the operation through the load/store slice (222*a*) pipeline. The instruction (452) may be received from the instruction sequencing unit (240), and the instruction (452) may be a load or store instruction.

During normal operation, a load operation may access data already stored in a data cache and the load operation finishes without being reissued. However, under some conditions, the load/store slice (222*a*) may determine that an instruction is to be reissued or rejected—where an instruction may be reissued immediately, or after some number of cycles dependent upon a rejection condition for the instruction being resolved. While it is often the case that a reissued instruction may complete, if a reissued instruction does not complete, sending a signal to the instruction sequencing unit (240) may result in instructions dependent upon the reissued instruction being awakened prematurely. Similarly, under some conditions, a store instruction may be unable to be performed.

The method of FIG. 4 also includes determining (404), at the load/store slice (224*a*), a rejection condition for the instruction (452). Determining (404) a rejection condition for the instruction (452) may be carried out by load/store slice (222*a*) determining one or more conditions that would cause the load/store slice (222*a*) to reject the instruction, including the data cache being unable to currently read a requested data address, a translation mechanism being unable to translate the requested data address, a load/miss queue being too busy to handle the instruction request, a detected hazard with other load or store instructions, waiting for a store forward to complete, among other possible conditions for rejecting an instruction.

The method of FIG. 4 also includes, responsive to determining, at the load/store slice (222*a*), a rejection condition for the instruction, maintaining (406) state information for the instruction in the load/store slice (222*a*) instead of notifying an instruction sequencing unit of a rejection of the instruction. Maintaining (406) state information for the instruction in the load/store slice (222*a*) may be carried out by logic within the load/store slice (222*a*) notifying—in the case of a load instruction—the load reorder queue (304) to modify status for an entry storing state information to indicate a sleep state or a state that would otherwise idle the instruction. Similarly, in the case that the instruction is a store instruction, the logic within the load/store slice (222*a*) may notify the store reorder queue (306) to modify status for an entry storing state information to indicate a sleep state or a state that would otherwise idle the instruction.

Further, maintaining the state information may include storing, for example, within an entry of the load reorder queue (304) or store reorder queue (306), information that may be used to reissue or relaunch the instruction after a notification is received to awaken due to a rejection condition being resolved, or due to a rejection condition being expected to resolve within a quantity of cycles.

For example, an entry may store, or maintain, information previously held to handle instructions so that a reissued instruction appears identical or similar to the instruction as originally received from an instruction sequencing unit. For example, an entry may store, or maintain, instruction operation codes, or opcodes, effective address information to determine which bytes in a cacheline are involved in an instruction, an ITAG, which may be used for ordering instructions, a real address, which may describe a cacheline address used by lower tiers of memory, and various control bits, among other information. Further, the entry may store, or maintain, a set of wait states corresponding to different rejection conditions, where this information may be a basis for awakening instructions in response to corresponding rejection conditions being resolved.

The load reorder queue (304) and the store reorder queue (306) are further configured to, in response to being notified to place an instruction into a sleep state, not send any signal or notification to the instruction sequencing unit that provided the instruction to prevent the instruction sequencing unit from prematurely awakening any instructions dependent on the instruction being placed into a sleep state.

For example, in response to the instruction sequencing unit (240) receiving a signal on the results bus (220) indicating that an instruction is being reissued, the instruction sequencing unit (240) may awaken instructions dependent on the reissued instruction in anticipation that a data valid signal is to follow, which would allow the dependent instructions to execute properly. However, if the load/store slice (222*a*) delays sending a signal that an instruction is being reissued, the instruction sequencing unit (240) does not awaken instructions dependent upon the reissued instruction, thereby avoiding cancelation of dependent instructions awakened for a reissued instruction that does not complete upon reissue, which prevents wasting execution cycles recovering from canceling the dependent instructions.

In this way, the load/store slice (222*a*) relieves the instruction sequencing unit from expending any resources tracking an instruction once the instruction sequencing unit provides the instruction to the load/store slice (222*a*) because the instruction sequencing unit relies on the load/store slice (222*a*) to handle the instruction to completion whether or not the load/store slice (222*a*) determines or identifies any rejection conditions that would have otherwise required the instruction sequencing unit to maintain status information for the instruction.

Figure 5:
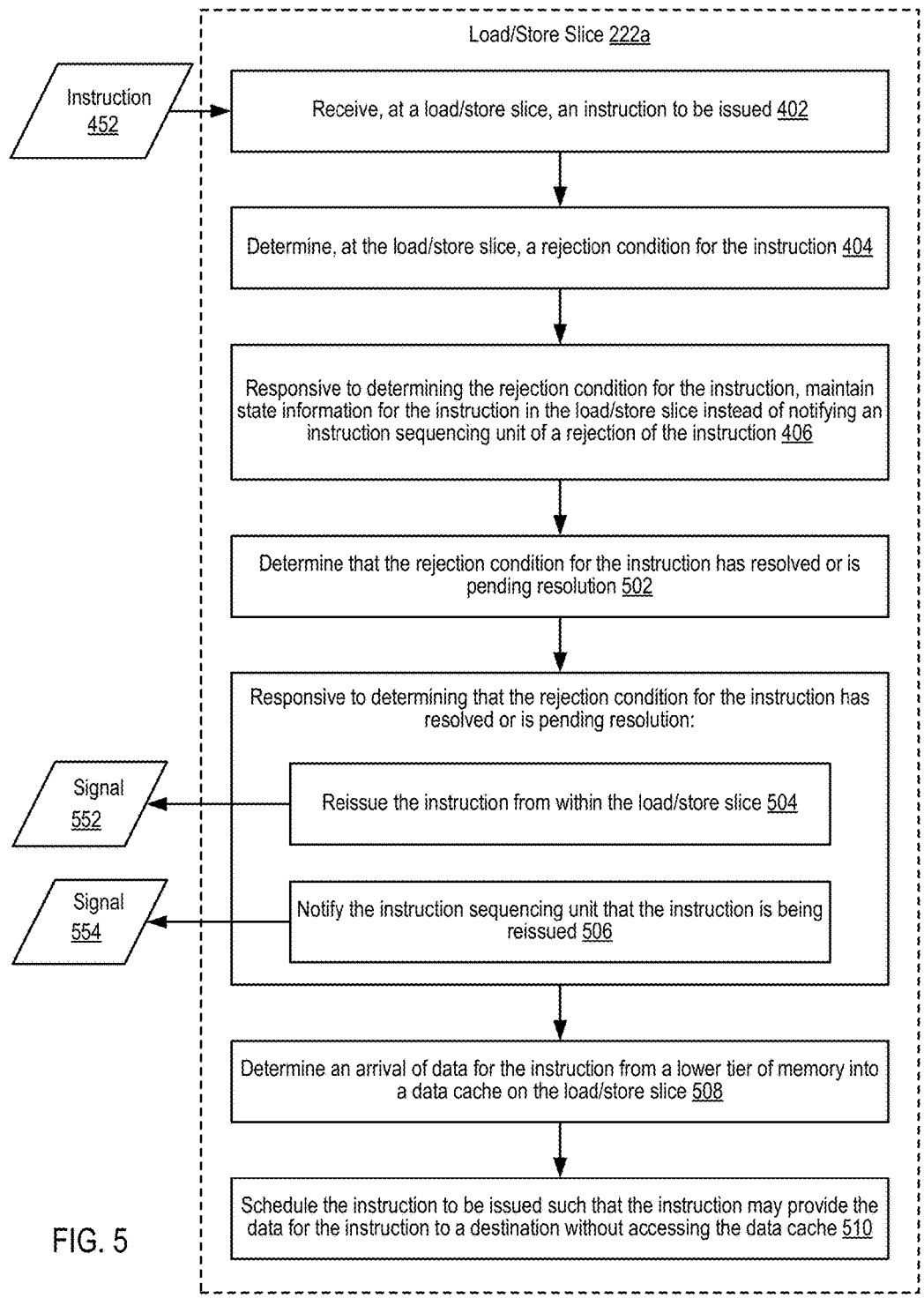
FIG. 5 sets forth a flow chart illustrating an exemplary method of operation of a multi-slice processor in which a load/store slice is configured to implements maintaining rejected instructions according to different embodiments.

For further explanation, FIG. 5 sets forth a flow chart illustrating an exemplary method of operation of a multi-slice processor implementing a load/store unit configured to maintain rejected instructions. The method of FIG. 5 may be carried out by a multi-slice processor similar to that in the examples of FIGS. 1-3. Such a multi-slice processor may include an instruction sequencing unit (240), and a plurality of load/store slices (220*a*-220*n*), where each of the load/store slices may implement a load/store access queue (224), a load reorder queue (304), and a store reorder queue (306), as described above with regard to FIG. 3.

The method of FIG. 5 is similar to the method of FIG. 4 in that the method of FIG. 5 also includes receiving (402), at a load/store slice (222*a*), an instruction (452) to be issued; determining (404), at the load/store slice (224*a*), a rejection condition for the instruction (452); and responsive to determining, at the load/store slice (222*a*), a rejection condition for the instruction, maintaining (406) state information for the instruction in the load/store slice (222*a*) instead of notifying an instruction sequencing unit of a rejection of the instruction.

The method of FIG. 5 differs from the method of FIG. 4, however, in that the method of FIG. 5 further includes: determining (502) that the rejection condition for the instruction has resolved or is pending resolution; responsive to determining that the rejection condition for the instruction has resolved or is pending resolution, reissuing (504) the instruction from within the load/store slice (222a) and notifying (506) the instruction sequencing unit that the instruction is being reissued; determining (508) an arrival of data for the instruction from a lower tier of memory into the data cache (232) on the load/store slice (222a); and scheduling (510) the instruction to be issued such that the instruction may provide the data for the instruction to a destination without accessing the data cache (232).

Determining (502) that the rejection condition for the instruction has resolved or is pending resolution may be carried out by the load/store slice (222a) determining that one or more of the conditions on which a rejection of the instruction may be based, as determined at (404), has been resolved or is expected to be resolved within some quantity of cycles. For example, the load/store slice (222a) may determine resolution of rejection conditions including: the data cache being unable to currently read a requested data address, a translation mechanism being unable to translate the requested data address, a load/miss queue being too busy to handle the instruction request, a detected hazard with other load or store instructions, waiting for a store forward to complete, among other possible conditions for rejecting an instruction.

The load/store slice (222a) may further determine, based on a type of rejection, a quantity of cycles within which a resolution of a rejection condition is expected to resolve, and notify the load reorder queue (304) or the store reorder queue (306).

Reissuing (504) the instruction (452) from within the load/store slice (222a) may be carried out by the load/store slice (222a) notifying either the load reorder queue (304) or the store reorder queue (306) to awaken an instruction previously placed in a sleep state or to awaken after passage, the lapse of, a quantity of cycles. In response to receiving a signal to awaken, the load reorder queue (304) or the store reorder queue (306) may signal (552) the load/store access queue (224) along line (314) to reissue or relaunch an instruction.

Further, the load/store slice (222a) may determine an order in which to awaken multiple instructions that are in a sleep state awaiting resolution of rejection conditions. In other words, while instructions arrive at the load/store slice (222a) in an order determined by an instruction sequencing unit, the load/store slice (222a) may reorder instructions such that any effect of the completed, reordered instructions, is consistent with the order in which the instructions were received from the instruction sequencing unit. For example, the load/store slice (222a) may determine awakening priorities based on at least in part on an age of an instruction, a measure of nearness to completion for the instruction, or according to an instruction that may take advantage of carry data forwarding.

Notifying (506) the instruction sequencing unit (240) that the instruction is being reissued may be carried out by the load reorder queue (304) or the store reorder queue (306) generating a signal (554) notifying the instruction sequencing unit (240) along line (312) to the results bus (220)— where the signal (554) may indicate to the instruction sequencing unit (240) an identification of a reissue signal, and an ITAG identifying the instruction being reissued.

Further, the load/store slice (222a) may propagate a signal to the instruction sequencing unit (240) indicating that the data requested by the load instruction, identifiable by an ITAG, is on a results bus and is valid, where the instruction sequencing unit (240) receives the signal and corresponds the signal with an indication that the data is valid and on the results bus (220).

Determining (508) an arrival of data for the instruction from a lower tier of memory into the data cache (232) on the load/store slice (222a) may be carried out by the load/store slice (222a) receiving an indication from a lower tier of memory that requested data is moving toward the data cache (232) and may be expected to be available at a given number of cycles. Such information may allow the load/store slice (222a) to awaken load instructions in time to make use of a carry data forward path.

Scheduling (510) the instruction to be issued such that the instruction may provide the data for the instruction to a destination without accessing the data cache (232) may be carried out by the load/store slice (222a) notifying the load reorder queue (304) to awaken a sleeping instruction in time so that the instruction may provide the data being received to a destination along a carry data forward path (310) without waiting for the requested data first being latched or stored in the data cache (232). In other words, the instruction makes use of the carry data forwarding technique described above with regard to FIG. 3. For example, the load/store slice (222a) may determine how many cycles from a current point to wait before sending an awaken signal to the load reorder queue (304) so that when the awakened instruction has progressed through reissue to make use of the requested data, the data is available.

In this way, the load/store slice (222a) may awaken instructions at points in time a number of cycles from a current point so that the awakened and reissued instructions are not delayed in completing.

Figure 6:
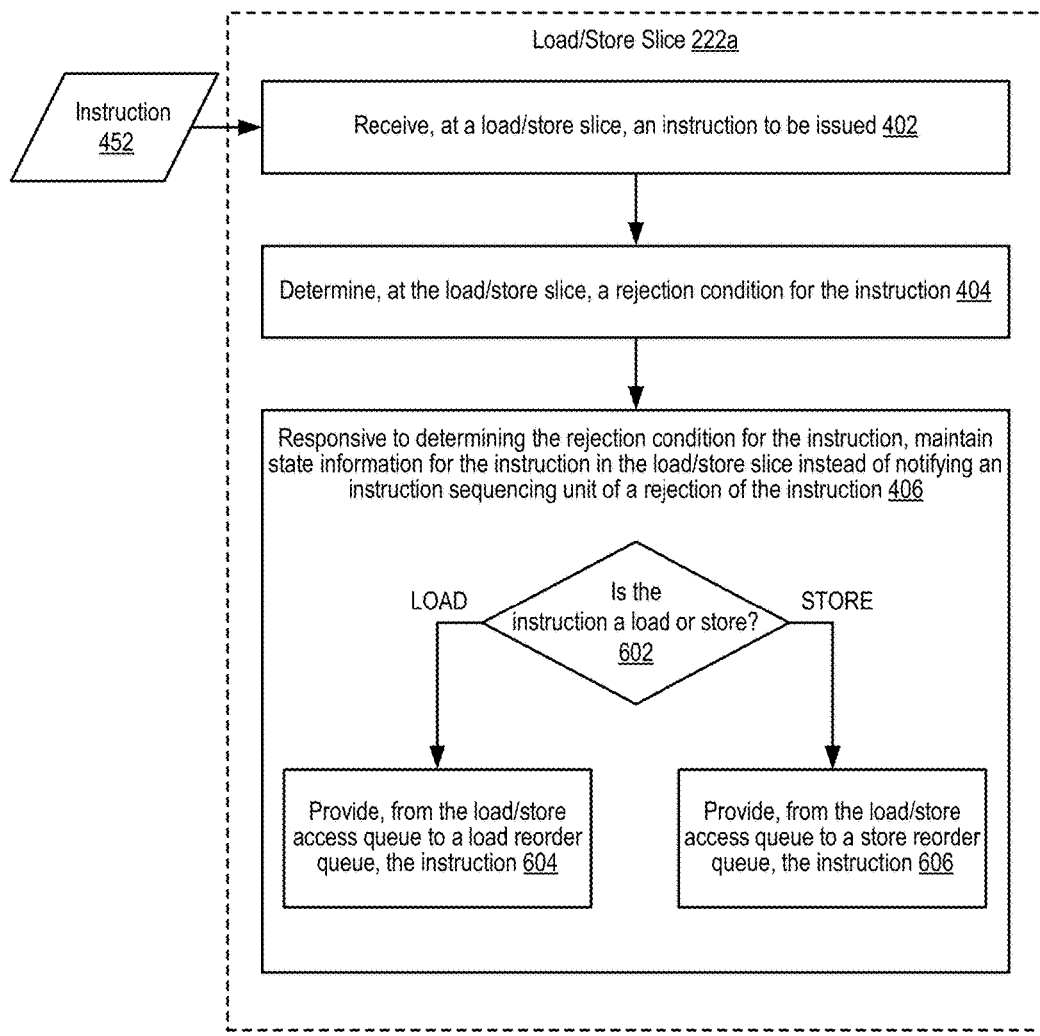
FIG. 6 sets forth a flow chart illustrating an exemplary method of operation of a multi-slice processor in which a load/store slice is configured to implements maintaining rejected instructions according to different embodiments.

For further explanation, FIG. 6 sets forth a flow chart illustrating an exemplary method of operation of a multi-slice processor implementing a load/store unit configured to maintain rejected instructions. The method of FIG. 6 may be carried out by a multi-slice processor similar to that in the examples of FIGS. 1-3. Such a multi-slice processor may include an instruction sequencing unit (240), and a plurality of load/store slices (220a-220n), where each of the load/store slices may implement a load/store access queue (224), a load reorder queue (304), and a store reorder queue (306), as described above with regard to FIG. 3.

The method of FIG. 6 is similar to the method of FIG. 4 in that the method of FIG. 6 also includes receiving (402), at a load/store slice (222a), a load instruction (452) to be issued; determining (404), at the load/store slice (224a), a rejection condition for the instruction (452); and responsive to determining, at the load/store slice (222a), a rejection condition for the instruction, maintaining (406) state information for the instruction in the load/store slice (222a) instead of notifying an instruction sequencing unit of a rejection of the instruction.

The method of FIG. 6 differs from the method of FIG. 4, however, in that the method of FIG. 5 further includes determining (602) if the instruction (452) is a load or a store, where if the instruction (452) is a load, then providing (604), from the load/store access queue (224) to the load reorder queue (304), the instruction, and if the instruction (452) is a store, then providing (606), from the load/store access queue (224) to the store reorder queue (306).

Determining (602) if the instruction (452) is a load or a store may be carried out by the load/store slice (222a) determining whether an opcode for the instruction (452) received from the instruction sequencing unit matches a load operation or a store operation.

Providing (604), from the load/store access queue (224) to the load reorder queue (304), the instruction (452) may be carried out by the load/store access queue (224) propagating the instruction (452) through MUX (228) along line (316) to the load reorder queue (304).

Providing (606), from the load/store access queue (224) to the store reorder queue (304), the instruction (452) may be carried out by the load/store access queue (224) propagating the instruction (452) through MUX (228) along line (316) to the store reorder queue (306).

In this way, the load/store access queue (224) may route load and store instructions to corresponding queues for handling the instruction, where both the load reorder queue (304) and the store reorder queue (306) include entries that are configured to maintain information for maintaining instructions that are determined to be subject to rejection conditions such that the maintained information may be used to reawaken and reissue the instructions pending resolution of one or more rejection conditions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices and a plurality of load/store slices, the method comprising:

receiving, at a load/store slice, an instruction to be issued; and responsive to determining a rejection condition for the instruction, maintaining state information for the instruction in the load/store slice.

2. The method of claim 1, further comprising:

determining that the rejection condition for the instruction has resolved or is pending resolution; and responsive to determining that the rejection condition for the instruction has resolved or is pending resolution, reissuing the instruction from within the load/store slice.

3. The method of claim 2, further comprising:

responsive to determining that the rejection condition for the instruction has resolved or is pending resolution, notifying an instruction sequencing unit that the instruction is being reissued.

4. The method of claim 2, wherein the instruction is a load instruction, and wherein the method further comprises:

determining an arrival of data for the instruction from a lower tier of memory into a data cache on the load/store slice; and scheduling the instruction to be issued such that the instruction may provide the data for the instruction to a destination without accessing the data cache.

5. The method of claim 1, further comprising:

determining that the rejection condition is expected to resolve within a quantity of cycles; and responsive to determining that the rejection condition is expected to resolve within the quantity of cycles, scheduling the instruction to be issued coincident with a lapse of the quantity of cycles.

6. The method of claim 1, wherein the load/store slice comprises a load/store access queue and a load reorder queue, and wherein receiving the instruction to be issued comprises:

determining that the instruction is a load instruction; and providing, from the load/store access queue to the load reorder queue, the instruction.

7. The method of claim 1, wherein the load/store slice comprises a load/store access queue and a store reorder queue, and wherein receiving the instruction to be issued comprises:

determining that the instruction is a store instruction; and providing, from the load/store access queue to the store reorder queue, the instruction.

* * * * *